United States Patent

White et al.

[15] 3,641,484
[45] Feb. 8, 1972

[54] CONTOUR-MAPPING SYSTEM

[72] Inventors: Donald J. White, Natick; William R. Navin, Jr., Raynham, both of Mass.

[73] Assignee: General Instrument Corporation, Newark, N.J.

[22] Filed: Mar. 10, 1970

[21] Appl. No.: 18,137

[52] U.S. Cl. ..............................340/3 R, 340/3 F, 340/3 PS, 343/5 CM, 343/5 PM
[51] Int. Cl. ..................................................G01s 9/66
[58] Field of Search................343/5 CM, 5 PM, 5 ST; 340/3, 340/3 F, 3 PS

[56] References Cited

UNITED STATES PATENTS 3,191,170   6/1965   Lustig et al. ..............................343/5
3,144,631   8/1964   Lustig et al. ..............................340/3

Primary Examiner—Richard A. Farley
Attorney—James and Franklin

[57] ABSTRACT

A system for mapping the contour of a surface from a mapping vehicle moving over said surface and having means for transmitting and receiving reflected radiation from said surface and which includes a display scope adapted to produce a visual trace in successive sweeps representing said surface contour. Means are provided for timing the commencement of said trace along said sweep in accordance with the angular position of said vehicle receiving means so that the angular position of said trace corresponds to the true angular position of said vehicle with respect to the vertical.

8 Claims, 8 Drawing Figures

PATENTED FEB 8 1972 3,641,484

INVENTORS
DONALD J. WHITE
WILLIAM R. NAVIN, JR.
BY James and Franklin
ATTORNEY

INVENTORS
DONALD J. WHITE
WILLIAM R. NAVIN, JR.
ATTORNEY

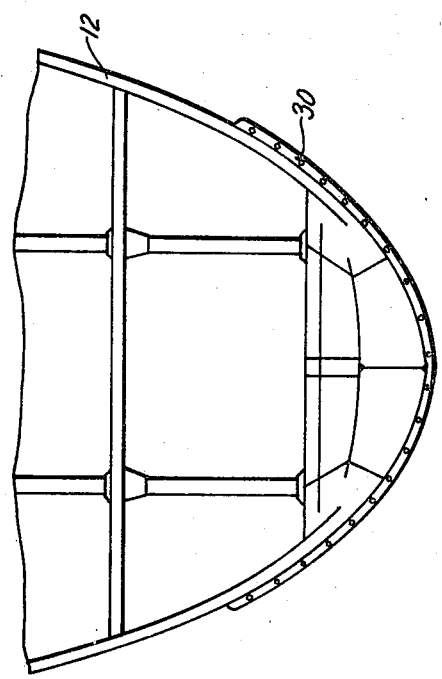

CONTOUR-MAPPING SYSTEM

The present invention relates to a system for mapping the surface of an area from a mapping station moving thereover, the mapping station emitting radiations which are reflected from said surface. Appropriate equipment is provided on the mapping station to receive the reflected radiation and thereby detect and visually display the contour of the surface over which said station is moving. The invention is here specifically disclosed as embodied in a shipborne system for mapping the contour of the floor of the ocean or other body of water. The invention, however, is not so limited and may be equally applicable to various other types of mapping stations and/or different forms of radiation. For example, the basic concepts of this invention may be utilized with an airborne mapping station using a radar ranging method for mapping the terrain over which it flies.

Mapping of the ocean floor through the use of sonar is not a new concept. The problems in implementing this concept involve the factors of accuracy, definition, and limitations on the speed at which the mapping vessel may traverse the ocean floor consistent with good accuracy and definition. Previous systems have had varying degrees of success in coping with these problems.

One system heretofore employed for this purpose involves the use of a single relatively narrow beam for scanning from side to side over a narrow strip area of the sea bottom, said beam serving both for transmission of said radiation and reception of the wave reflections from the sea bottom. Because of the relatively slow speed with which sound travels through water, the single transmission and reception beam necessitates a relatively slow scan, the scanning time being dependent upon the depth of the water. As a result the mapping vessel is prohibitively restricted as to the speed with which it may move over the surface to be mapped consistent with satisfactory accuracy and definition. Moreover, the use of such a single beam scan makes it highly impractical to provide accurate compensation for angular aberrational deviations of the mapping vessel with respect to the surface to be mapped. It will be apparent that such deviations, such as roll and pitch of the vessel, particularly in rough water and at small sea depths, may cause a significant reduction in accuracy and definition.

By way of contrast, the present invention is designed for use with a bottom-scanning sonar system utilizing the crossed fan beam technique. Such a technique is more fully disclosed in U.S. Pat. No. 3,144,631 filed in the name of Howard E. Lustig et al., and assigned to the assignee of the present invention, and will therefore be only broadly described herein.

In accordance with that disclosure separate beams are utilized for transmission and reception, thus dividing the burden of directivity between the two beams and hence greatly simplifying design. A thin fan-shaped beam is transmitted downwardly in a plane preferably perpendicular to the heading of the ship to illuminate successively long narrow area of the ocean floor lying perpendicular to the ship's heading, producing a substantially continuous mapping coverage of a strip of the sea bottom. Reflected radiations are received by the mapping station in a plurality of closely spaced narrow downwardly extending fan-shaped beams the planes of which are preferably oriented substantially perpendicular to the transmitting beam, and hence substantially parallel to the fore and aft direction of the ship. Thus, each of the individual receiving beams will cover a thin narrow area of the ocean floor, said areas lying side by side and intersecting the area illuminated by the transmitted beam.

The transmitting beam emanates from a transmitter comprising a plurality of individual transmitting elements arranged longitudinally of the ship's hull, and the reflected radiation receiver comprises a plurality of individual receiver elements arranged laterally of the ship's hull. Since the ship's hull is usually curved, it is necessary either to mount the receiving elements spaced from the hull in a common plane, or if they are mounted directly on the hull, to compensate for their departure from a common plane. This is accomplished by adjusting the relative phases of the individual signals produced by the individual receiver elements so that said elements are effectively at the same distance from a reference plane.

The crossed fan beam technique described above produces an accurate representation of an appreciably wide area of the sea bottom while the ship is moving at cruising or even higher speeds. The problem of roll or pitch deviations of the mapping vessel remains, however. The aforementioned Lustig et al. patent discloses one method of compensating for such deviations. Since the receiver beams extend in the fore and aft direction of the ship a sufficient distance to encompass a vertical plane through the ship perpendicular to its fore and aft direction at all expectable pitch angles, pitch compensation, in accordance with the Lustig et al. patent, is accomplished by electronically stabilizing the transmitted beam to remain in a vertical plane during pitching. Roll compensation is accomplished by providing a sufficient number of receiving beams to subtend an angle corresponding to an area strip of greater width than that to be mapped. Means are provided for selecting for mapping purposes only those beams intersecting the area to be mapped notwithstanding the roll of the ship.

These systems for compensating for aberrational deviations, and especially roll deviations, have proved unsatisfactory in a number of respects. The needed mechanisms and circuits are complicated and expensive to install and maintain. In addition, servosystems which include moving parts are particularly prone to failure. Moreover, the roll control system is costly to operate since it must generate more receiving beams than are actually utilized in the mapping process. Finally any malfunction or inaccuracy in the roll compensator is difficult to detect during operation.

Accordingly, it is a primary object of this invention to provide a simple inexpensive system for compensating for roll of a vessel mapping station in relation to the surface to be mapped.

It is another object of the present invention to provide a roll compensator for moving mapping station which utilizes all the receiving beams generated.

It is a further object of the present invention to provide a roll compensator for a moving mapping station having a contour display means and in which significant inaccuracies due to system malfunction are immediately apparent from the display means.

It is still a further object of the present invention to design a roll compensator, the compensation mechanism of which is completely electronic, using no moving parts.

It is yet another object of the present invention to design a roll compensator for a contour mapping system which utilizes standard electronic digital components for producing a roll-compensated contour display.

To these ends, the present invention comprises a roll compensator for use with a crossed fan beam-type bottom-scanning contour-mapping system, in which reflected radiation is received from the ocean floor via a plurality of receiving beams angularly vertically disposed in the athwartship plane. The thus sensed contour is displayed as a plurality of individual traces, corresponding to said individual receiver beams, on a continuous sweep cathode ray tube. Means are provided for rotating the plurality of traces an angle corresponding to the instantaneous angle of roll of the vessel, thereby to visually indicate the actual surface area being mapped with respect to the vertical. The means for rotating the trace image comprises means for producing a digital signal corresponding to instantaneous ship roll. Such digital signal is used to control the timing of the commencement of the trace images along the CRT sweep. In combination with the above a "pitch null" mode is utilized to initiate transmission and display only at times when the pitch of the vessel is minimal.

To the accomplishment of the above, and to such other objects as may hereinafter appear, the present invention relates to a mapping system and means for compensating for the angular deviation of the mapping station thereof, as defined in the appended claims, and as described in this specification together with the accompanying drawings in which:

FIG. 5 is a diagrammatic cross-sectional view of the lateral arrangement of the receiving means along the ship's hull; and FIG. 6 is a block diagram of the electronic systems used to control the cathode-ray tube display, and particularly the trace commencement along the sweep.

This invention will be here specifically described as embodied in a bottom-scanning sonar system carried by a vessel for mapping the ocean floor 10. It will, of course, be apparent that the system here disclosed may be modified for use with a submarine (in which case compensation would have to be made for the depth of the vessel below the surface 14 of the sea), or indeed any type of moving mapping station travelling over any surface (e.g., airborne radar-mapping of the earth's terrain), such modifications not affecting the basic principles of the present invention, Moreover, the particular arrangement of the transmitting and receiving means here disclosed is for illustrative purposes only, and forms no part of the present invention.

Figure 1:
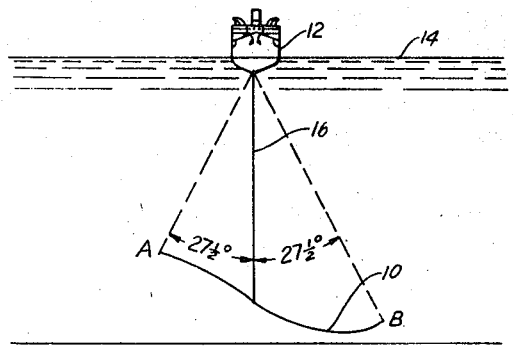
FIG. 1 is a schematic view illustrating the scanning of a single narrow laterally oriented strip of the ocean floor, with the mapping ship in a no-roll condition.
Figure 1A:
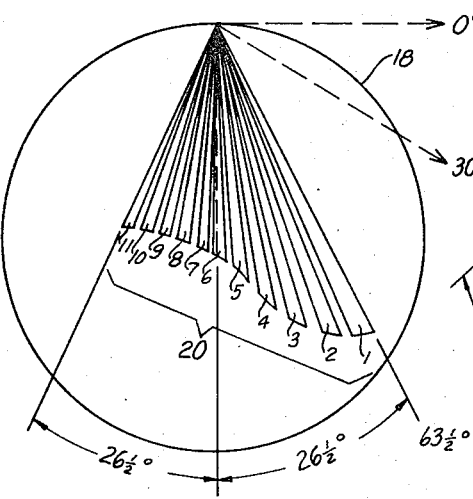
FIG. 1a illustrates the CRT display corresponding to the real situation depicted in FIG. 1.

FIG. 1 illustrates schematically the bottom-scanning sonar technique used with the present invention. The ship 12, assumed to be moving into the plane of the paper, is adapted to scan a narrow strip of the ocean floor 10 of width AB. In broad terms the ship 12 scans the sea bottom 10 by means of transmitted sonar radiation, and is adapted to receive such radiations reflected from the surface 10 by means of a plurality of fan-shaped receiving beams collectively flaring out a fixed angle from a vertical plane 16 through ship 12 in the fore and aft direction. The width AB of the surface strip mapped will, of course, depend on the angle subtended by the receiving beams and the depth of the ocean floor below sea level 14. In the embodiment here disclosed eleven receiving beams are utilized each 5° wide and spaced 5° center to center. Thus, the vessel 12 is adapted to receive reflected radiation through a total angle of 55° athwartship, by 5° fore and aft. The receiving elements are arranged on the ship's hull such that in the normal no-roll condition (e.g., constant heading in a calm sea) illustrated in FIG. 1, the number 6 beam is centered on the true vertical, the other ten beams being angularly disposed five on each side, the 11 beams collectively subtending an angle of 27½° on each side of the plane 16. The reflected radiations in each receiving beam are detected and identified in terms of range (time delay between transmission and reception) and lateral location along the width of strip AB (angular relationship to vertical plane 16 through ship 12 in the fore and aft direction). The electronic systems involved in this detection and identification form no part of the present invention, a typical system being specifically described in the aforementioned Lustig et al. patent. The outputs from the 11 beams are converted in known manner into visual traces, designated 1–11 in FIGS. 1a and 2a, on the scope of a continuous sweep cathode-ray tube 18. As illustrated in FIG. 1a, a display analog 20 of the actual situation shown in FIG. 1 is produced, the display being similar to a PPI, except that it maps the vertical athwartship plane and is off-centered so as to place the ship 12 at the top of the display 20.

TRANSMITTER

Figure 3:
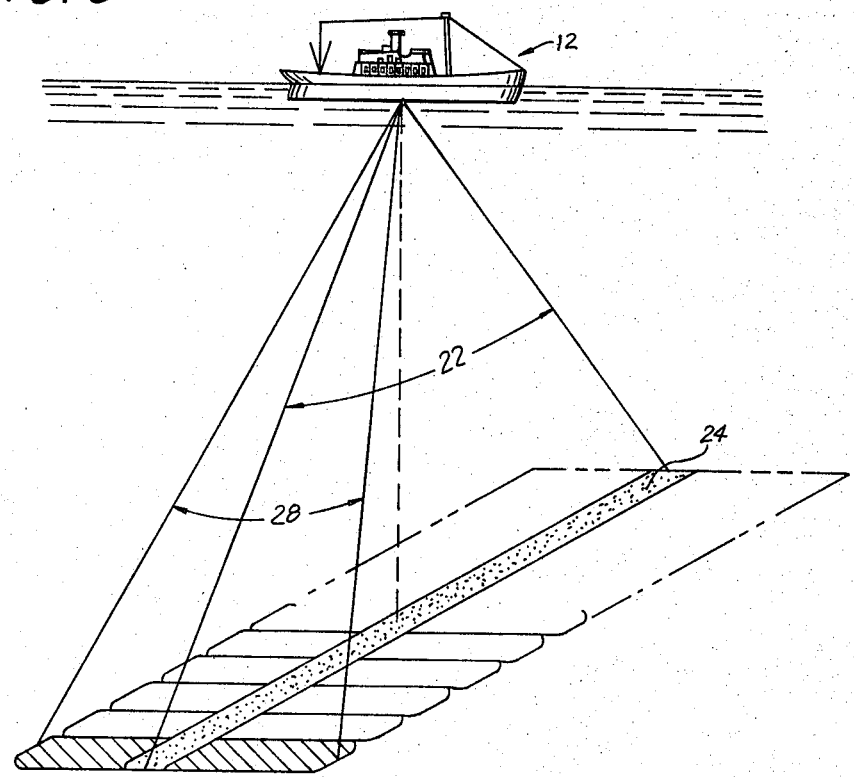
FIG. 3 is a diagrammatic perspective view of the orientation of the transmitting and receiving beams used in the cross fan beam technique.
Figure 4:
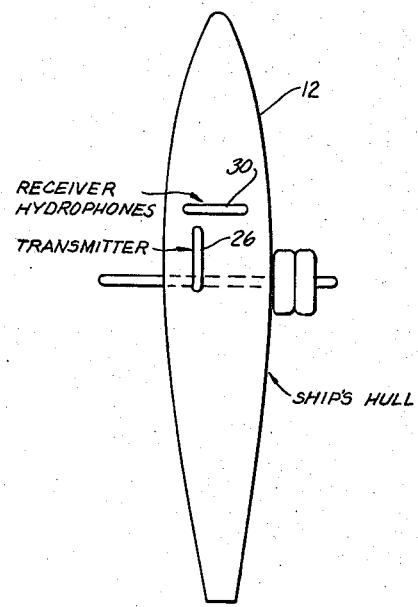
FIG. 4 is a diagrammatic plan view illustrating a typical arrangement of the transmitting and receiving means on the ship's hull, and in relation thereto the area of the sea bottom covered by the transmitted beam and a selected few of the receiving beams.

The fan beam technique utilized to generate the CRT trace is schematically illustrated in FIG. 3. The sonar energy emanating from ship 12 is transmitted in the form of a thin fan beam 22 lying in a substantially vertical plane perpendicular to the heading of the ship. The beam 22, which may be approximately 5° thick, illuminates a long narrow area 24 of the ocean floor extending generally perpendicular to the ship's heading. As the ship progresses, this illuminated strip 24 sweeps out an area determined by the speed and direction of movement of the ship 12. The transmitter 26 may be located on the ship's hull at a position such as illustrated in FIG. 4, and may be composed of a plurality of individual transmitter elements arranged longitudinally on the hull as indicated.

Pulse transmission at the proper repetition frequency and power level is initiated by a keying pulse. The pulse frequency and its relationship to the depth of the sea and the forward speed of ship 12 may be determined by analysis, such analysis being detailed in the aforementioned Lustig et al. patent. In accordance with the "pitch null" mode of operation described hereinafter, transmitter keying may be delayed beyond the normal repetition frequency until the vessel is in the "pitch null" mode.

RECEIVER

For receiving transmitted radiations which are reflected from the sea bottom or other terrain being mapped, a plurality of individual fan-shaped receiving beams generally designated 28 are employed (FIG. 3). The planes of these beams are oriented substantially perpendicular to the transmitted beam 22, that is to say, they are narrow widthwise of the ship 12 and are long in the fore-and-aft direction of the ship 12. The beams 28 intersect the illuminated area 24 along adjacent segments thereof.

The receiver array which is used to sense the return echo determines the directivity of the sonar system in the athwartship direction. In the present embodiment 11 beams are generated by processed signals from 20 hydrophones generally designated 30 mounted laterally on the ship's hull as schematically illustrated in FIG. 5. Phasing networks simultaneously generate 11 beams, spaced at intervals of 5° center-to-center along the length of the strip AB illuminated by each transmitted pulse.

Factors affecting the physical arrangement of the 20 hydrophones along the ship's hull are adequately outlined in the aforementioned Lustig et al. patent.

FIG. 6 schematically illustrates the signal flow involved in the generation of the receiver beams and the display of reflected radiation.

In order to generate a preformed beam i.e., to set up a particular receiving channel corresponding to one of the 11 beam directions, an appropriate time delay in the signal from each hydrophone is introduced and all signals are thereafter combined in a signal receiver. This is accomplished by a beamforming matrix generally designated 32 in a manner also described in the aforementioned Lustig et al. patent. The 11 receivers generally designated 34 detect the thus-formed 11 beams and filter out the carrier signal. The beams are then transmitted to a display matrix generally designated 36. Display matrix 36 comprises a display multiplexer adapted to sequentially sample the 11 beams and apply them in sequence to the video amplifier which provides "z" axis modulation to the cathode-ray tube.

To compensate for signal attenuation due to water absorption and spreading a time-varied gain amplifier generally designated 38 is adapted to control the signal gain as a function of time after pinging.

ROLL AND PITCH COMPENSATION

Aberrational movements of the ship 12 must be compensated for in order to accurately locate the position of the area strip of the sea bottom which is being mapped relative to the position of the ship. Because the ship is moving over the sea bottom in fore-and-aft direction, the problems involved in compensating for roll and pitch are somewhat different.

In the aforesaid Lustig et al. patent, means are described for steering the transmitted beam with respect to the pitch motion of the ship by electronic steering, that is, by adjusting the electrical phase of the elements or transmitters in the projecting array. The unsteered beam produced by driving all elements in phase is confined closely to a true plane. When the beam is steered, the maximum energy in the phase is along the elements of a shallow cone whose axis lies along the axis of the projecting array, that is, parallel to the ship's long axis. Steering the beam electronically results in varying the angle between an element of the cone and its axis. The unsteered beam represents the condition when the angle is 90° and the cone degenerates to a plane. Thus, the beam can be steered so that one of the transmitted rays or cone elements is vertical, but the other rays depart slightly from the vertical plane. Beam-steering improves the direction of radiation but does not accomplish the objective perfectly. Moreover, the use of this system is complex and costly and may lead to appreciable errors in the high seas, when pitch angles are large. In such a case, therefore, the preferred mode of operation is the "pitch null" mode. Instead of transmitting regularly, say at 0.5, 1, or 2 second intervals, the transmissions occur only when the pitch angle is zero, or within a certain range close to zero. By pinging at that instant a transmitting beam is generated which most closely approaches a true vertical plane. "Pitch null" is here arbitrarily defined as a pitch of less than 2½° from the vertical.

FIG. 6 schematically illustrates the signal flow of the pitch and roll information in accordance with the present invention. The pitch and roll of the ship 12 are detected by conventional vertical sensors generally designated 40. The sensor in the present instance may be an unbalanced bridge, using a commercially available gravity-sensing electrolytic transducer e.g., model EP 03 manufactured by Hamlin Inc. Two of these circuits are a commercially available gravity-sensing electrolytic transducer (e.g. model EP 03 manufactured by Hamlin Inc.). Two of these circuits are used, one for roll-sensing and one for pitch-sensing. In a pitch-roll condition the tube is tilted and the electrolyte covers more of one leg than the other, thereby causing more current to flow through this leg. Accordingly, the greater the tilt angle, the greater the unbalance and the higher the bridge output. To distinguish between plus or minus roll angle the sensor output is applied to a phase-sensitive detector circuit generally designated 42. Phase-sensitive detector 42 is adapted to provide in known manner a plus or minus DC voltage output which is proportional to tilt angle. The plus or minus DC VOLTAGE OUTPUT FROM THE pitch-sensitive detector circuit is converted by means of a Schmitt trigger generally designated 44 into a "pitch null" determining signal. Thus the output from Schmitt trigger 44 is 0 volts for a "pitch null" condition and 3 volts for angles of pitch greater than ±2½°. The "pitch null" window width and position are both, of course, selectable parameters. Since there is a direct relationship between voltage and pitch angle, the window width is controlled by increasing or decreasing the gain in the last amplifier of the pitch-phase-sensitive detector circuit. The window position is adjusted by controlling the level offset at the input of the Schmitt trigger circuit.

The 0- or 3-volt DC output from the Schmitt trigger circuit 44 goes to one input of a NAND-gate generally designated 46. The purpose of NAND-gate 46 is to control the transmitter keying and CRT display initiation by means of key generator 48. Thus, when the output of NAND-gate 46 represents a pitch null condition (e.g., 0 volts DC) transmission and display is initiated.

ROLL SIGNAL FLOW

Roll correction for the CRT display originates with the roll vertical sensor 40, and as previously described, the output signal is processed by the phase-sensitive detector circuit to give an output which is proportional to roll angle. In the present system, a total of 40° of roll (−20° to ±20°) is converted into an output of ±11 volts DC in order to obtain a binary number for use with the CRT control. This output is level-shifted and scaled, in known manner, to arrange of 0 to ±8 volts by means of a level changer generally designated 50. The output from level changer is converted to a binary number (decimal range 0 to 80) by a conventional analog to digital converter generally designated 52. This binary number is then used to control the commencement of individual traces displayed from the 11 receiving channels.

A sweep generator generally designated 54 initiates a complete sweep (360°) every $10^{-3}$ sec. When the sweep thus generated passes 0° which is arbitrarily defined on the CRT 18 in the 3 o'Clock position (FIG. 1a), the number which is in the analog to digital converter 52 is loaded into a roll counter generally designated 56. When the trace reaches 30°(4 o'clock position on the CRT), a roll counter comprising a count roll flip-flop generally designated 56 is set and starts adding to the number stored in the roll counter, one count for each additional ½° covered by the CRT trace. For example, in the no-roll condition, the roll-phase-sensitive detector output is 2 volts DC and the output of converter 52 is 40 (decimal no.). This number is stored in the roll counter 56 as a binary number. When the trace reaches 30° on the CRT 18, one count is added to the roll counter for each additional ½° the CRT sweeps, as indicated in the following table:

| Scope | Roll Counter |
|---|---|
| 0° | 40 |
| . | . |
| . | . |
| . | . |
| 30° | 40 |
| 31° | 42 |
| . | . |
| . | . |
| 62.5° | 105 |

When we detect the number "105" in the roll counter (scope trace at 62.5) the beam counter 58 is set and causes the first beam to be displayed on the CRT (as illustrated in FIG. 1a, the first beam would be centered on the 65° line, its width extending from 63.5° to 66.5°). The beam counter counts in 1° steps from 1 to 55 and every 5 counts the beam counter selects another beam for display, scanning sequentially from starboard to port. In order to avoid switching transients and to aid the operator in discriminating between beams, the first and last degree of each beam may be blanked on the CRT -* AS illustrated. In this manner, the 11 receiving beams are sequentially sampled and displayed. The display of beam 11 is concluded when the beam counter increments from a count of 54 to 55. The beam counter 58 then resets to zero in preparation for the next sweep. For the no-roll case the number 6 beam is shown perpendicular to the ocean surface as indicated by FIGS. 1 and 1a.

Figure 2A:
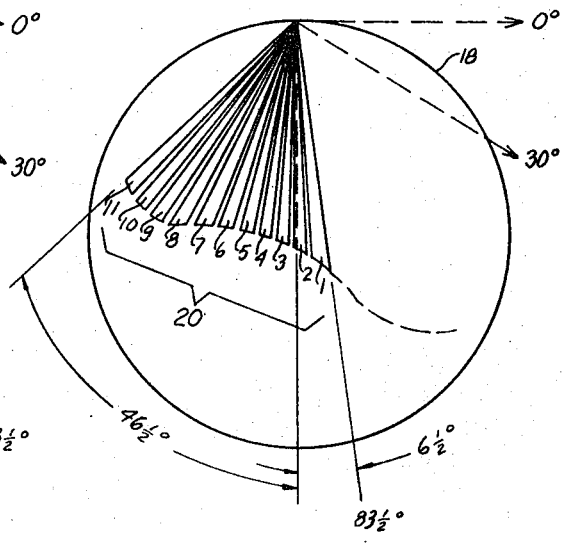
FIG. 2a illustrates the CRT display, in accordance with this invention, corresponding to the real situation depicted in FIG. 2.
Figure 2:
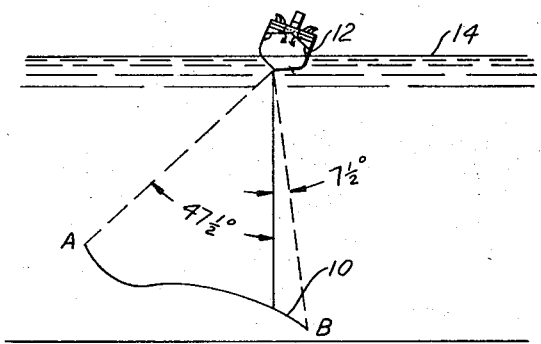
FIG. 2 is a schematic view similar to that of FIG. 1 showing the mapping ship in a 20°-roll condition.

FIG. 2 schematically illustrates the ship 12 in a 20° roll attitude. The corresponding scope trace is shown in FIGS. 2a and is generated as follows. The roll-phase-sensitive detector output is 0 volts DC and converter 52 loads the binary number zero into the roll counter when the CRT trace passes 0°. When the CRT trace passes 30° one count is added for each additional ½° covered by the CRT, in the same manner as the previous example.

| Scope | Roll Counter |
|---|---|

| | |
|---|---|
| 0° | 0 |
| . | . |
| . | . |
| . | . |
| 30° | 0 |
| 31° | 2 |
| . | . |
| 82.5° | 105 |

This time "105" appears in the roll counter when the CRT trace is at 82.5°. For this condition number 2 beam is vertical, and the effect of the compensation is to rotate the 11 beams on the display, so that the operator observes on the CRT 18, the true relationship between those beams which are displayed and their interception which the ocean bottom. In this manner the CRT always displays as vertical on the CRT that beam which in fact is perpendicular to the ocean surface, independent of roll within +or −20° and thus CRT display 18 always presents a true representation of the ocean bottom independent of ship's attitude.

The manner in which the analog display 20 is used may vary. A series of such displays may be photographed or otherwise reproduced, and appropriate maps synthesized therefrom. Alternately, the display analogs 20 may be used to produce a contour map representation directly, in a manner such as is disclosed in the U.S. Pat. No. 3,191,170, entitled "Contour Mapping System," filed in the name of Howard E. Lustig et al. and assigned to the assignee of the present invention.

Finally, a graphic recorder may be utilized to generate a profile of the ocean floor directly beneath the mapping vessel 12. This may be accomplished by selecting that one of the 11 receiving beams which is most nearly vertical as the input to an analog graphic recorded as schematically illustrated in FIG. 6. The time between transmission and reception of the vertical beam is illustrated by marks along a line generated by the recorder pin which is adapted to move vertically at a prescribed rate while the paper moves horizontally in accordance with the ship's speed.

The CRT display of the present invention may be positioned adjacent to a conventional gyro or roll indicator. The operator may thus compare the angular displacement of the contour display with the roll ship represented on the roll indicator. Significant variations between the two will be immediately detected, thus preventing the continuous mapping of an erroneous contour.

CONCLUSION

The system of the present invention provides for continuous, effective and accurate mapping from a mapping station moving over that terrain at an appreciable speed. A completely electronic system, using relatively inexpensive standard digital components, accurately conforms the CRT display contour to the roll of the mapping vessel. The system is more reliable, cheaper and easier to maintain than the servosystems commonly used for this purpose. Moreover, failure of the system is immediately apparent to the operator merely by comparing the scope trace angular position to the real situation.

The specific construction of the various elements involved, and the specific design of the several electrical circuit components, may be varied widely, and may take known forms. Accordingly, they have been here disclosed schematically or in block diagram form.

Although only a single embodiment of the present invention has been here specifically disclosed, it will be apparent that many variations may be made therein, all within the scope of the invention as defined in the following claims.

We claim:

1. In a system for mapping and displaying the contour of an area from a receiving station moving over said area in a first direction which comprises means for transmitting a beam of energy from said station, said beam being narrow in said first direction and wide in a second direction perpendicular to said first detection, means for receiving said transmitted radiation reflected from said area in a plurality of adjacent individual receiving beams intercepting said transmitting beams along said second direction, and means for displaying said received radiation in a form visually representing the contour of said area; the improvement comprising means for sensing the angular position of said receiving means with respect to a reference angular position, means for producing an output proportional to the deviation of said angular position from said reference angular position, and means operatively connected to said display means and responsive to said output from angularly adjusting said visual representation to correspond to the contour which would be represented if said receiving means were in said reference angular position, said adjusting means comprising means operatively connected to said sensing means for converting said angular deviation to a digital signal, the angular position of said representation being responsive to said digital signal.

2. The contour-mapping system of claim 1, in which said receiving means comprises a plurality of individual receiving elements fixedly mounted on said receiving station and each adapted to receive said reflected radiation from a different angular direction with respect to said receiving station, thereby collectively subtending a given angular receiving area, said reference angular position of said receiving means corresponding to a reference angular position of said receiving station with respect to its plane of travel.

3. The contour-mapping system of claim 1, wherein said display means comprises an electronic display scope operatively connected to said receiving means and adapted to produce a visual trace in successive sweeps representing the c contour of the area subtended by said receiving beams, and wherein said adjusting means comprises means for rotating the trace projected on such cathode-ray tube an amount equal to the angular deviation of said receiving means from said reference angular position.

4. The contour-mapping system of claim 2, wherein said receiving station moves in a generally horizontal plane and wherein said receiving means, when in said reference angular position, comprises an equal number of receiving elements angularly disposed on either side of a vertical plane extending through said receiving station in said first direction.

5. The contour-mapping system of claim 4, wherein said display means comprises an electronic display scope operatively connected to said receiving means and adapted to produce a visual trace in successive sweeps representing the contour of the area subtended by said receiving beams, and wherein said adjusting means comprises means for rotating the trace projected on such cathode-ray tube an amount equal to the angular deviation of said receiving means from said reference angular position.

6. The contour-mapping system of claim 5, wherein said rotating means comprise s means operatively connected to said sensing means for producing a digital signal corresponding to said angular deviation and means for timing the commencement of said trace along said sweep in accordance with said digital signal. 2. 7. In a method of mapping the contour of an area from a receiving station moving over said area in a first direction and visually displaying said sensed contour, comprising the steps of transmitting a beam of energy from said receiving station, said beam being narrow in said first direction and wide in a second direction perpendicular to said first direction, receiving said transmitted beam reflected from said area in a plurality of adjacent individual receiving beams intercepting said transmitted beams along said second direction and subtending a given portion of said area, and displaying said received radiation on an electronic display scope operatively connected to said receiving means and adapted to produce a visual trace in successive sweeps representing the contour of said given portion of said area; the improvement comprising:

1. sensing the angular position of said individual receiving beams with respect to a reference angular position;

2. Producing a digital signal corresponding to said sensed angular position; and
3. timing the commencement of said trace along said sweep in accordance with said digital signal.

8. In a system for mapping and displaying the contour of an area from a receiving station moving over said area in a first direction which comprises means for transmitting a beam of energy from said station, said beam being narrow in said first direction and wide in a second direction perpendicular to said first direction, means for receiving said transmitted radiation reflected from said area in a plurality of adjacent individual receiving beams intercepting said transmitting beams along said second direction, and means for displaying said received radiation in a form visually representing the contour of said area; the improvement comprising means for sensing the angular position of said receiving means with respect to a reference angular position, and means operatively connected to said display means and responsive to said output for angularly adjusting said visual representation to correspond to the contour which would be represented if said receiving means were in said reference angular position, said receiving means comprising a plurality of individual receiving elements fixedly mounted on said receiving station and each adapted to receive said reflected radiation from a different angular direction with respect to said receiving station, thereby collectively subtending a given angular receiving area, said reference angular position of said receiving means corresponding to a reference angular position of said receiving means corresponding to a reference angular position of said receiving station with respect to its plane of travel, said receiving station moving in a generally horizontal plane and said receiving means, when in said reference angular position, comprising an equal number of receiving elements angularly disposed on either side of a vertical plane extending through said receiving station in said first direction, said display means comprising an electronic display scope operatively connected to said receiving means and adapted to produce a visual trace in successive sweeps representing the contour of the area subtended by said receiving beams, and wherein said adjusting means comprises means for rotating the trace projected on such display scope an amount equal to the angular deviation of said receiving means from said reference angular position, said rotating means comprising means operatively connected to said sensing means for producing a digital signal corresponding to said angular deviation and means for timing the commencement of said trace along said sweep in accordance with said digital signal.

* * * * *